United States Patent
Ohyama et al.

(10) Patent No.: US 6,721,932 B2
(45) Date of Patent: Apr. 13, 2004

(54) SEMICONDUCTOR INTEGRATED CIRCUIT DEVICE INCLUDING CIRCUIT BLOCK HAVING HIERARCHICAL STRUCTURE AND METHOD OF DESIGNING THE SAME

(75) Inventors: Tatsushi Ohyama, Ogaki (JP); Hideki Yamauchi, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 97 days.

(21) Appl. No.: 10/011,978

(22) Filed: Dec. 11, 2001

(65) Prior Publication Data

US 2002/0070759 A1 Jun. 13, 2002

(30) Foreign Application Priority Data

Dec. 11, 2000 (JP) ........................... 2000-375490

(51) Int. Cl.$^7$ ............................................. G06F 17/50
(52) U.S. Cl. ............................................. 716/7; 716/1
(58) Field of Search ....................................... 716/1–14

(56) References Cited

U.S. PATENT DOCUMENTS

| | | | |
|---|---|---|---|
| 5,649,176 A | * | 7/1997 | Selvidge et al. ............ 713/400 |
| 5,867,691 A | | 2/1999 | Shiraishi |
| 5,949,692 A | * | 9/1999 | Beausang et al. ............ 716/18 |
| 6,173,408 B1 | * | 1/2001 | Jimbo et al. ................ 713/322 |
| 6,536,024 B1 | * | 3/2003 | Hathaway ..................... 716/6 |

FOREIGN PATENT DOCUMENTS

| | | |
|---|---|---|
| JP | 3-156966 | 7/1991 |
| JP | 5-259279 | 10/1993 |
| JP | 11-74466 | 3/1999 |
| JP | 2000-123059 | 4/2000 |

OTHER PUBLICATIONS

"Technical White Paper of Low–Power LSIs" Nikkei Microdevices by Nikkei Business Publications, Inc., 1994, p. 80.

* cited by examiner

Primary Examiner—Matthew Smith
Assistant Examiner—Sun James Lin
(74) Attorney, Agent, or Firm—McDermott, Will & Emery

(57) ABSTRACT

A semiconductor integrated circuit device of low power consumption having a hierarchical structure is obtained. This semiconductor integrated circuit device employs at least one gated clock selected from a group including at least three gated clocks consisting of at least two gated clocks generated by employing at least two operation control signals output to different hierarchies as gate signals and a prescribed gated clock input in a circuit block of the most significant hierarchy as a gated clock input in circuit blocks of lower hierarchies below a third hierarchy among the plurality of circuit blocks. Thus, a plurality of gated clocks for reducing power consumption are readily mechanically decided. When at least one gated clock satisfying a prescribed circuit constraint is selected from the plurality of gated clocks, a semiconductor integrated circuit device of low power consumption is readily obtained.

20 Claims, 3 Drawing Sheets

SEMICONDUCTOR INTEGRATED CIRCUIT DEVICE INCLUDING CIRCUIT BLOCK HAVING HIERARCHICAL STRUCTURE AND METHOD OF DESIGNING THE SAME

BACKGROUND OF THE INVENTION

1. Field of the Invention

The present invention relates to a semiconductor integrated circuit device and a method of designing the same, and more particularly, it relates to a semiconductor integrated circuit device including a circuit block having a hierarchical structure and a method of designing the same.

2. Description of the Prior Art

In recent years, a semiconductor integrated circuit device applied to an electronic device or the like must be miniaturized, weight-saved, power-saved and reduced in cost. In consideration of such requirements, a system LSI prepared by providing a memory and various types of logic circuits on a single chip is developed. A method of designing a semiconductor integrated circuit device with reference to a basic unit of a circuit block, also referred to as a functional block (IP), including a number of cells implementing certain functions is generally known as a design technique corresponding to such a system LSI. In relation to such a method of designing a semiconductor integrated circuit device with reference to the basic unit of the circuit block, a method of designing a semiconductor integrated circuit device by creating a hierarchical structure with reference to the basic unit of the circuit block is also known.

In the aforementioned method of designing a semiconductor integrated circuit device by creating the hierarchical structure with reference to the basic unit of the circuit block, a method using a gated clock employing a gate turning on a clock only when necessary is also proposed as a method of reducing power consumption. This gated clock is described in "Technical White Paper of Low-Power LSIs", extra issue of Nikkei Microdevices by Nikkei Business Publications, Inc., 1994, p. 80, for example.

Further, Japanese Patent Laying-Open No. 2000-123059, for example, discloses a method of designing a semiconductor integrated circuit device with reference to a basic unit of the aforementioned circuit block. This gazette discloses a design method reducing power consumption by sharing parts sharable between blocks in a single hierarchy.

However, the aforementioned gazette discloses only a design method related to reduction of power consumption in a single hierarchy, with no disclosure of a design method related to reduction of power consumption in a hierarchical structure. In general, therefore, it is difficult to provide a simple design method for reducing power consumption in relation to design of a semiconductor integrated circuit device including a plurality of circuit blocks having a hierarchical structure. Particularly when the semiconductor integrated circuit device has a hierarchical structure including at least three hierarchies, the hierarchical structure is so complicated that it is difficult to provide a simple design method related to reduction of power consumption. In general, therefore, it is difficult to design a semiconductor integrated circuit device of low power consumption by a simple method if the semiconductor integrated circuit device has a hierarchical structure including at least three hierarchies.

When the semiconductor integrated circuit device has a hierarchical structure, the structure of a gated clock employed for reducing power consumption is generally disadvantageously complicated. Particularly when the semiconductor integrated circuit device has a hierarchical structure including at least three hierarchies, the hierarchical structure is complicated to result in remarkable complicatedness of the structure of the gated clock. In order to change the design of the semiconductor integrated circuit device for changing the combination of the circuit blocks or the hierarchical structure, further, the structure of the gated clock must be newly redesigned in general. In general, therefore, it is difficult to simply design the structure of the gated clock for changing the design of the semiconductor integrated circuit device.

SUMMARY OF THE INVENTION

An object of the present invention is to readily obtain a semiconductor integrated circuit device of low power consumption by selecting a gated clock for reducing power consumption by a simple method when the semiconductor integrated circuit device has a hierarchical structure.

Another object of the present invention is to provide a method of designing a semiconductor integrated circuit device capable of readily selecting a gated clock for reducing power consumption when the semiconductor integrated circuit device has a hierarchical structure.

A semiconductor integrated circuit device according to a first aspect of the present invention comprises a plurality of circuit blocks having a hierarchical structure including at least three hierarchies and outputting an operation control signal from each upper hierarchy to each lower hierarchy, and employs at least one gated clock selected from a group including at least three gated clocks consisting of at least two gated clocks generated by employing at least two operation control signals output to different hierarchies as gate signals and a prescribed gated clock input in a circuit block of the most significant hierarchy as a gated clock input in a circuit block of a lower hierarchy below a third hierarchy among the plurality of circuit blocks. The semiconductor integrated circuit device of the present invention includes a semiconductor integrated circuit device in the designing stage.

According to the aforementioned structure, the semiconductor integrated circuit device according to the first aspect mechanically simply decides a plurality of gated clocks for reducing power consumption on the basis of the operation control signal and the prescribed gated clock input in the circuit block of the most significant hierarchy. When at least one gated clock satisfying a prescribed circuit constraint is selected from the plurality of gated clocks, a semiconductor integrated circuit device of low power consumption can be readily obtained.

In the semiconductor integrated circuit device according to the aforementioned first aspect, a master clock is preferably input in a circuit block of a first hierarchy defining the most significant hierarchy among the plurality of circuit blocks as the gated clock, and a circuit block of a second hierarchy defining a lower hierarchy for the first hierarchy preferably receives either a gated clock generated by employing an operation control signal output from the circuit block of the first hierarchy to the second hierarchy as a gate signal or the master clock. According to this structure, the gated clocks input in the circuit blocks of the first and second hierarchies for reducing power consumption can be readily selected.

In the semiconductor integrated circuit device according to the aforementioned first aspect, at least one gated clock satisfying a prescribed circuit constraint among the plurality of gated clocks included in the aforementioned group is preferably input in the circuit block below the third hierarchy. According to this structure, at least one gated clock satisfying the prescribed circuit constraint is input in the circuit block below the third hierarchy, whereby optimized gated clocks satisfying the prescribed circuit constraint can be readily supplied in the circuit blocks having the hierarchical structure. In this case, the prescribed circuit constraint preferably includes such a constraint that a single gated clock operates at least a prescribed number of flip-flops. According to this structure, it is possible to select a gated clock more suitable for low power consumption than a case of flip-flops operating in excess of the prescribed number. Thus, a semiconductor integrated circuit device capable of further reducing power consumption can be obtained.

In the semiconductor integrated circuit device according to the aforementioned aspect, the circuit block of the lower hierarchy preferably operates only during operation of the circuit block of the upper hierarchy.

In the semiconductor integrated circuit device according to the aforementioned first aspect, each circuit block preferably includes a data holding circuit for holding data and a selection circuit for selecting whether or not to hold newly input data in the data holding circuit on the basis of the operation control signal. According to this structure, whether or not to hold the data can be readily selected on the basis of the operation control signal. In this case, the data holding circuit preferably includes a flip-flop, and the selection circuit includes a selector for selecting whether or not to latch new data in the flip-flop. In this case, the flip-flop preferably latches and holds an input signal in response to the selector only when the operation control signal is ON, and the flip-flop preferably outputs held data when the operation control signal is OFF. According to this structure, whether or not to hold the input signal in the flip-flop can be readily selected.

The semiconductor integrated circuit device according to the aforementioned first aspect preferably further comprises a gated clock generation part for generating the gated clock, and the gated clock generation part preferably includes a flip-flop and an AND circuit. According to this structure, the gated clock can be readily generated.

In the semiconductor integrated circuit device according to the aforementioned first aspect, each circuit block may be supplied with a single gated clock.

A method of designing a semiconductor integrated circuit device according to a second aspect of the present invention is a method of designing a semiconductor integrated circuit device comprising a plurality of circuit blocks having a hierarchical structure including at least three hierarchies and outputting an operation control signal from each upper hierarchy to each lower hierarchy, comprising steps of selecting at least one gated clock from a group including at least three gated clocks consisting of at least two gated clocks generated by employing at least two operation control signals output to different hierarchies as gate signals and a prescribed gated clock input in a circuit block of the most significant hierarchy as a gated clock input in a circuit block of a lower hierarchy below a third hierarchy among the plurality of circuit blocks and designing for inputting at least one selected gated clock in the circuit block below the third hierarchy.

The method of designing a semiconductor integrated circuit device according to the second aspect mechanically simply decides a plurality of gated clocks for reducing power consumption on the basis of the operation control signal and the prescribed gated clock input in the most significant hierarchy according to the aforementioned structure. When at least one gated clock satisfying a prescribed circuit constraint is selected from the plurality of gated clocks, therefore, a semiconductor integrated circuit device of low power consumption can be readily designed. Also when the design is changed for changing the combination of the circuit blocks or the hierarchical structure, the gated clocks input in the circuit blocks can be readily selected on the basis of the operation control signals and the gated clock input in the most significant hierarchy. Therefore, the design of the circuit blocks can also be readily changed.

In the method of designing a semiconductor integrated circuit device according to the aforementioned second aspect, the step of selecting at least one gated clock input in the circuit block of the lower hierarchy below the third hierarchy preferably includes a step of selecting at least one gated clock satisfying a prescribed circuit constraint from the plurality of gated clocks included in the group. In this case, the step of selecting at least one gated clock satisfying the prescribed circuit constraint preferably includes steps of determining whether or not a first gated clock generated through the operation control signal for the lower hierarchy satisfies the prescribed circuit constraint and selecting the first gated clock when the first gated clock satisfies the prescribed circuit constraint while replacing the first gated clock with a second gated clock for the upper hierarchy satisfying the prescribed circuit constraint when the first gated clock does not satisfy the prescribed circuit constraint. According to this structure, the gated clock satisfying the prescribed circuit constraint can be automatically selected. In this case, the prescribed circuit constraint includes such a constraint that a single gated clock operates at least a prescribed number of flip-flops. According to this structure, it is possible to select a gated clock more suitable for low power consumption than a case of flip-flops operating in excess of the prescribed number. Thus, a semiconductor integrated circuit device capable of further reducing power consumption can be designed. In the aforementioned case, the method of designing a semiconductor integrated circuit device preferably further comprises a step of deleting the unnecessary first gated clock for the lower hierarchy when replacing the first gated clock with the second gated clock for the upper hierarchy. According to this structure, the gated clock satisfying the circuit constraint can be automatically selected.

In the method of designing a semiconductor integrated circuit device according to the aforementioned second aspect, a master clock is preferably input as the gated clock in a circuit block of a first hierarchy defining the most significant hierarchy among the plurality of circuit blocks, and a circuit block of a second hierarchy defining a lower hierarchy for the first hierarchy preferably receives either a gated clock generated by employing an operation control signal output from the circuit block of the first hierarchy to the second hierarchy as a gate signal or the master clock. According to this structure, gated clocks input in the first and second hierarchies for reducing power consumption can be readily selected.

The method of designing a semiconductor integrated circuit device according to the aforementioned second aspect preferably operates the circuit block of the lower hierarchy only during operation of the circuit block of the upper hierarchy.

In the method of designing a semiconductor integrated circuit device according to the aforementioned second aspect, each circuit block preferably includes a data holding circuit for holding data and a selection circuit for selecting whether or not to hold newly input data in the data holding circuit on the basis of the operation control signal, the data holding circuit preferably holds an input signal in response to the selection circuit only when the operation control signal is ON, and the data holding circuit outputs held data when the operation control signal is OFF. According to this structure, whether or not to hold the input signal in the data holding circuit can be readily selected on the basis of the operation control signal. In this case, the data holding circuit preferably includes a flip-flop, and the selection circuit preferably includes a selector for selecting whether or not to latch new data in the flip-flop.

The method of designing a semiconductor integrated circuit device according to the aforementioned second aspect preferably further comprises a step of providing a gated clock generation part, having a flip-flop and an AND circuit, for generating the gated clock. According to this structure, a semiconductor integrated circuit device capable of generating a gated clock can be readily designed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

Figure 1:
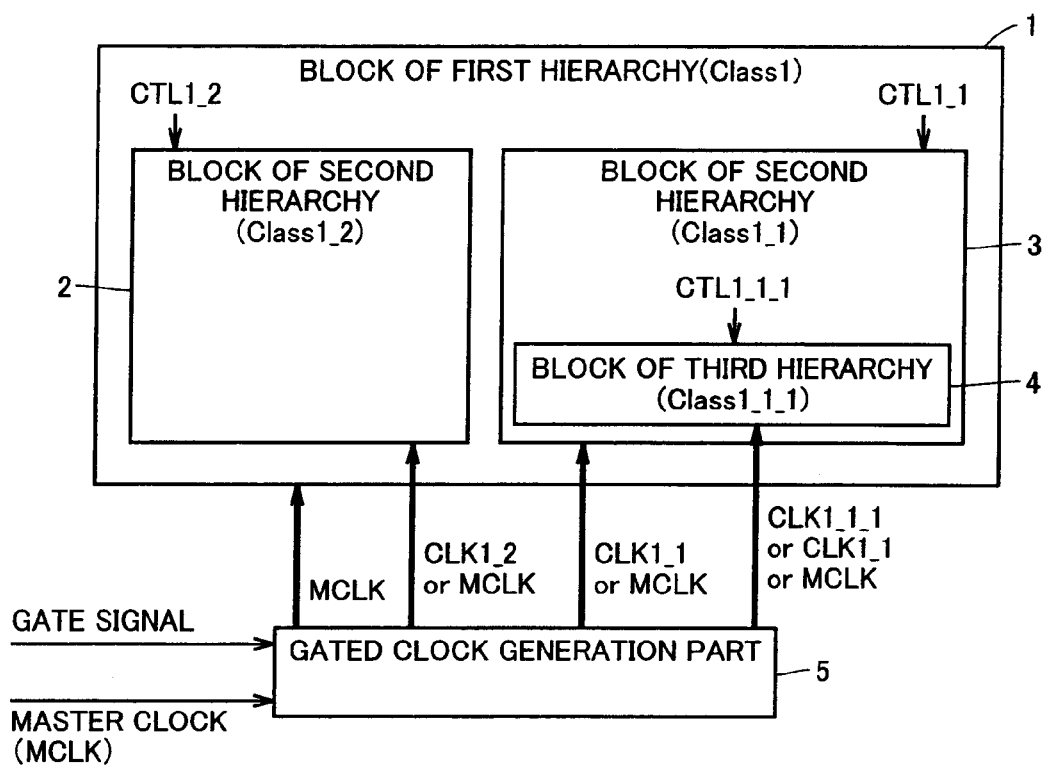
FIG. 1 is a block diagram showing the structure of a semiconductor integrated circuit device including circuit blocks having a hierarchical structure including three hierarchies.

Referring to FIG. 1, a semiconductor integrated circuit device according to the embodiment of the present invention comprises a plurality of circuit blocks 1 to 4 having a hierarchical structure including three hierarchies. A circuit block (Class 1_2) 2 of a second hierarchy and another circuit block (Class 1_1) 3 of the second hierarchy are provided as the lower hierarchy for a circuit block (Class 1) 1 of a first hierarchy forming the most significant hierarchy. A third circuit block (Class 1_1_1) 4 of a third hierarchy is provided as the lower hierarchy for the circuit block (Class 1_1) 3 of the second hierarchy. The semiconductor integrated circuit device according to the embodiment of the present invention includes the semiconductor integrated circuit device in the designing stage.

A gated clock generation part 5 supplies a gated clock to each of the circuit blocks 1 to 4. The circuit block 1 of the first hierarchy outputs an operation control signal CTL1_2 to the circuit block 2 of the second hierarchy. The circuit block 1 of the first hierarchy outputs an operation control signal CTL1_1 to the circuit block 3 of the second hierarchy. The circuit block 3 of the second hierarchy outputs an operation control signal CTL1_1_1 to the circuit block 4 of the third hierarchy. Thus, each upper hierarchy outputs an operation control signal to each lower hierarchy. Thus, the circuit block of the lower hierarchy operates only when the circuit block of the upper hierarchy operates.

Figure 2:
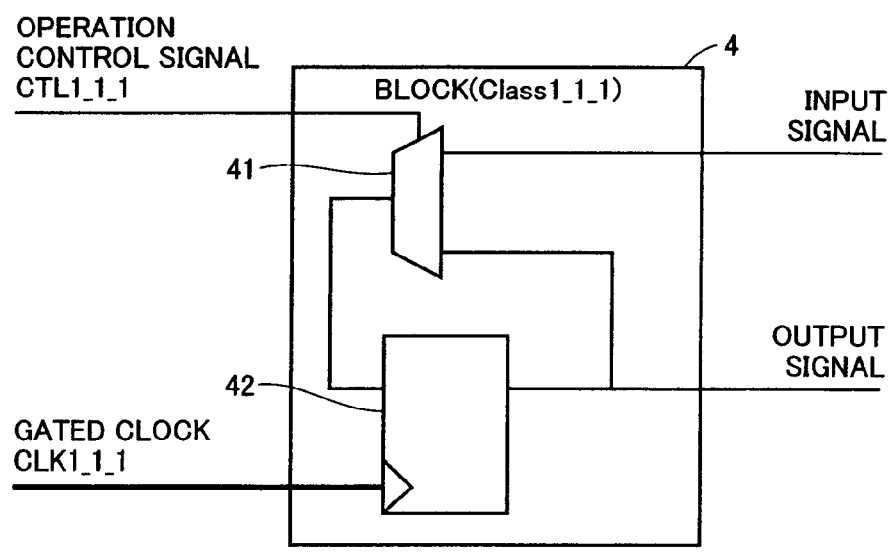
FIG. 2 is a block diagram for illustrating the internal structure of a circuit block of a third hierarchy shown in FIG. 1 along with signals.

As shown in FIG. 2, the circuit block 4 of the third hierarchy forming the least significant hierarchy includes a flip-flop 42 for holding data and a selector 41 for selecting whether or not to latch newly input data in the flip-flop 42 on the basis of the operation control signal CTL1_1_1. The selector 41 receives an input signal and the operation control signal CTL1_1_1. The flip-flop 42 receives a signal from the selector 41 and a gated clock CLK1_1_1.

In operation, the selector 41 makes the flip-flop 42 latch and hold the input signal only when the operation control signal CTL1_1_1 is ON. When the operation control signal CTL1_1_1 is OFF, the flip-flop 42 may simply output the held value. According to this embodiment, the remaining circuit blocks 1 to 3 are similar in structure to the circuit block 4 of the third hierarchy shown in FIG. 2.

Figure 3:
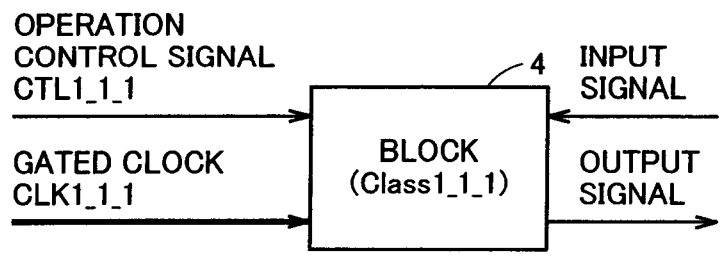
FIG. 3 is a block diagram showing the internal structure of the circuit block of the third hierarchy shown in FIG. 1 as a black box.

FIG. 3 shows the inner part of the circuit block 4 of the third hierarchy shown in FIG. 2 as a black box. In general, the circuit blocks 1 to 4 of the respective hierarchies are shown as in FIG. 3.

Figure 4:
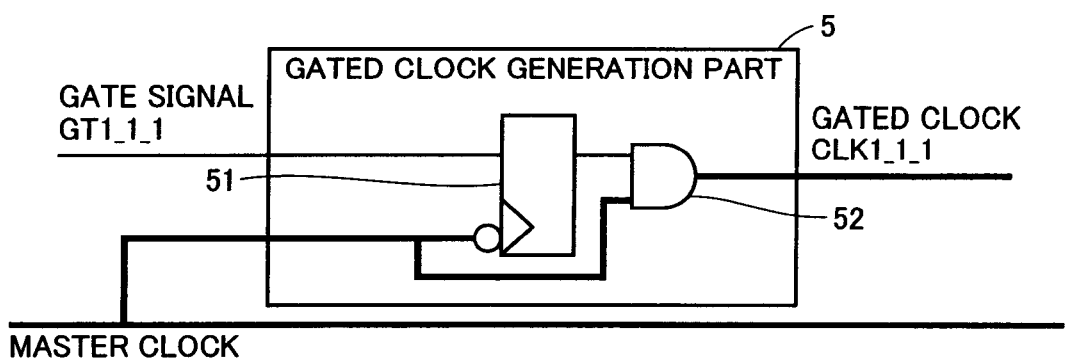
FIG. 4 is a block diagram illustrating the structure of a gated clock generation part shown in FIG. 1 in detail.

In the circuit block 4 of the third hierarchy shown in FIGS. 2 and 3, the flip-flop 42 may simply output the held value when the operation control signal CTL1_1_1 is OFF as described above, and hence no clock may be supplied in this case. According to this embodiment, the gated clock CLK1_1_1 is employed for supplying a clock only when necessary for the operation, in order to reduce power. As shown in FIG. 4, the gated clock generation part 5 includes a flip-flop 51 and an AND circuit 52.

Figure 5:
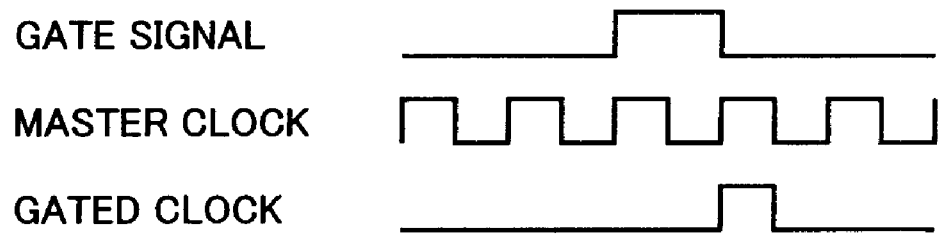
FIG. 5 is a timing chart for illustrating operations of the gated clock generation part shown in FIG. 4.

An input end of the flip-flop 51 receives a gate signal equivalent to any operation control signal or a gate signal (e.g., a signal regularly at "1") for outputting a clock equivalent to a master clock serving as any gated clock. Another input end of the flip-flop 51 receives the master clock. The AND circuit 52 receives the master clock and an output of the flip-flop 51. Thus, the AND circuit 52 outputs the gated clock. Referring to FIG. 4, the clock generation part 5 generates the gated clock CLK1_1_1 input in the circuit block 4 of the third hierarchy shown in FIG. 1. In this case, a gate signal GT1_1_1 equivalent to the operation control signal CTL1_1_1 is employed as the gate signal. FIG. 5 shows signal timings in this case, for example.

In the block structure according to the embodiment having three hierarchies, the gated clock generation part 5 supplies gated clocks to the circuit blocks 1 to 4 independently of each other, as shown in FIG. 1. At this time, the gated clock generation part 5 supplies a single gated clock to each of the circuit blocks 1 to 4. When two gated clocks are supplied to any of the circuit blocks 1 to 4, this circuit block is divided for keeping the rule of the aforementioned single gated clock according to this embodiment.

According to this embodiment, the gated clock generation part 5 supplies the following gated clocks to the circuit blocks 1 to 4:

First, the gated clock generation part 5 supplies the master clock (MCLK) to the circuit block (Class 1) 1 of the first hierarchy forming the most significant hierarchy as the gated clock, as shown in FIG. 1. The gated clock generation part 5 supplies a gated clock CLK1_2 generated by employing the operation control signal CTL1_2 as a gate signal or the master clock (MCLK) to the circuit block (Class 1_2) 2 of the second hierarchy forming the lower hierarchy for the circuit block 1 of the first hierarchy. The gated clock generation part 5 supplies a gated clock CLK1_1 generated by employing the operation control signal CTL1_1 as a gate signal or the master clock (MCLK) to the circuit block (Class 1_1) 3 of the second hierarchy.

The gated clock generation part 5 supplies a gated clock CLK1_1_1 generated by employing the operation control signal CTL1_1_1 as a gate signal, the gated clock CLK1_1 generated by employing the operation control signal CTL1_1 for the upper hierarchy as a gate signal or the master clock (MCLK) to the circuit block (Class 1_1_1) 4 of the third hierarchy.

Figure 6:
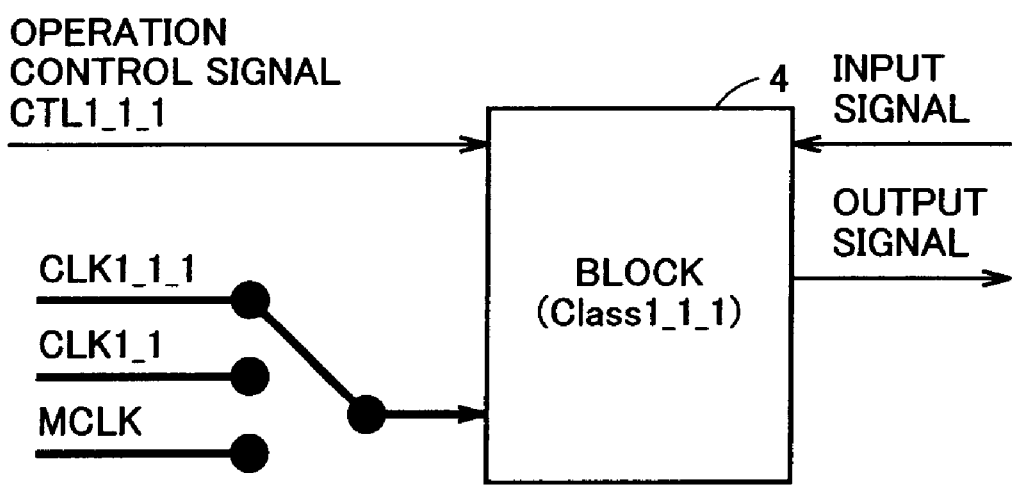
FIG. 6 is a schematic diagram for illustrating a method of selecting a gated clock for the circuit block of the third hierarchy shown in FIG. 1.

FIG. 6 is a schematic diagram for illustrating a method of selecting the gated clock for the circuit block 4 of the third hierarchy shown in FIG. 1. With reference to FIG. 6, the procedure of selecting one of the aforementioned three gated clocks CLK1_1_1, CLK1_1 and MCLK for the circuit block 4 of the third hierarchy is now described.

First, whether or not the gated clock CLK1_1_1 generated by employing the operation control signal CTL1_1_1 input in the circuit block 4 of the third hierarchy as the gate signal satisfies the following circuit constraint is investigated. For example, whether or not a single gated clock operates at least a prescribed number (M) of flip-flops according to the circuit constraint is investigated. If satisfying the aforementioned constraint, the gated clock CLK1_1_1 is supplied to the circuit block 4 of the third hierarchy as shown in FIG. 6. If not satisfying the aforementioned circuit constraint, the gated clock CLK1_1_1 is replaced with the gated clock CLK1_1 for the upper hierarchy.

In other words, the gated clock CLK1_1_1, originally supplied to the circuit block 4 of the third hierarchy, is replaced with the gated clock CLK1_1 for the upper hierarchy when the same is in violation of the aforementioned constraint. Further, the same is replaced with the master clock (MCLK) for the most significant hierarchy if necessary. Thereafter the unnecessary gated clock CLK1_1_1 is deleted.

When the aforementioned method is employed, a gated clock satisfying the circuit constraint can be automatically generated in a method of designing a block base having a hierarchical structure.

Also as to the circuit block (Class 1_2) 2 of the second hierarchy, whether or not the gated clock CLK1_2 originally supplied to this circuit block 2 satisfies the circuit constraint is investigated. If satisfying the circuit constraint, the gated clock CLK1_2 is supplied to the circuit block 2 of the second hierarchy (see FIG. 1). If in violation to the circuit constraint, the gated clock CLK1_2 is replaced with the master clock (MCLK). Also as to the circuit block (Class 1_1) 3 of the second hierarchy, whether or not the gated clock CLK1_1 originally supplied to this circuit block 3 satisfies the circuit constraint is investigated. If satisfying the circuit constraint, the gated clock CLK1_1 is supplied to the circuit block 3 of the second hierarchy. If in violation to the prescribed circuit constraint, the gated clock CLK1_1 is replaced with the master clock (MCLK).

According to this embodiment, any one of the gated clocks CLK1_1_1 and CLK1_1 generated by employing the two operation control signals CTL1_1_1 and CTL1_1 output to different hierarchies as gate signals and the master clock is employed as the gated clock input in the circuit block 4 of the third hierarchy, whereby a plurality of gated clocks for reducing power consumption can be mechanically simply decided. Thus, when a single gated clock satisfying the prescribed circuit constraint is selected from the plurality of gated clocks, a semiconductor integrated circuit device of low power consumption can be readily obtained.

The master clock is supplied to the circuit block 1 of the first hierarchy forming the most significant hierarchy while supplying the gated clocks CLK1_2 and CLK1_1 corresponding to the operation control signals CTL1_2 and CTL1_1 or the master clock to the circuit blocks 2 and 3 of the second hierarchy, so that the gated clocks supplied to the circuit block 1 of the first hierarchy and the circuit blocks 2 and 3 of the second hierarchy for reducing power consumption can be readily selected.

Also when the design of the semiconductor integrated circuit device is changed for changing the combination of the circuit blocks 1 to 4 or the hierarchical structure, the gated clocks input in the circuit blocks 1 to 4 can be readily selected on the basis of the operation control signals CTL1_1, CTL1_2 and CTL1_1_1 and the master clock input in the most significant hierarchy. Consequently, the design can also be readily changed.

Although the present invention has been described and illustrated in detail, it is clearly understood that the same is by way of illustration and example only and is not to be taken by way of limitation, the spirit and scope of the present invention being limited only by the terms of the appended claims.

For example, while the above embodiment has been described with reference to the semiconductor integrated circuit device comprising circuit blocks having a hierarchical structure including three hierarchies, the present invention is not restricted to this but is also applicable to a semiconductor integrated circuit device having a hierarchical structure including at least four hierarchies. In this case, gated clocks similar to those in the aforementioned embodiment are selected and supplied to blocks of first to third hierarchies. Each of circuit blocks subsequent to a fourth hierarchy is supplied with a gated clock satisfying a prescribed circuit constraint selected from an operation control signal input in this hierarchy and the operation control signals for the upper hierarchies and the master clock. As to each of the circuit blocks of the lower hierarchies subsequent to the circuit block of the fourth hierarchy, the gated clock satisfying the circuit constraint can be automatically selected by a method similar to that for the aforementioned circuit block 4 of the third hierarchy.

While the above embodiment has been described with reference to the circuit constraint stating that a single gated clock operates at least the prescribed number (N) of flip-flops, the present invention is not restricted to this but another circuit constraint may also be employed as the case may be. For example, a circuit constraint stating that the total of the types of the gated clocks is not more than the prescribed number (N) may be added to the aforementioned circuit constraint related to the number of the flip-flops.

While a single gated clock is supplied to each of the circuit blocks 1 to 4 in the aforementioned embodiment, the present invention is not restricted to this but a plurality of gated clocks may be supplied to each circuit block.

While a single operation control signal is input in each of the circuit blocks 2 to 4 in the aforementioned embodiment, the present invention is not restricted to this but a plurality of operation control signals may be input in each circuit block.

What is claimed is:

1. A semiconductor integrated circuit device comprising:
    a first circuit block;
    a second circuit block controlled by an operation control signal generated in said first circuit block; and
    a third circuit block controlled by an operation control signal generated in said second circuit block, wherein
    employing one gated clock selected from a group consisting of at least two gated clocks generated by employing said operation control signals generated in said first and second circuit blocks as gate signals and a prescribed gated clock input in said first circuit block as a gated clock input in said third circuit block.

2. The semiconductor integrated circuit device according to claim 1, wherein
    one gated clock satisfying a prescribed circuit constraint among the plurality of gated clocks included in said group is input in said third circuit block.

3. The semiconductor integrated circuit device according to claim 2, wherein
    said prescribed circuit constraint includes such a constraint that a single gated clock operates at least a prescribed number of flip-flops.

4. The semiconductor integrated circuit device according to claim 1, wherein
    each said circuit block includes:
        a data holding circuit for holding data, and
        a selection circuit for selecting whether or not to hold newly input data in said data holding circuit on the basis of said operation control signal.

5. The semiconductor integrated circuit device according to claim 4, wherein
    said data holding circuit includes a flip-flop, and
    said selection circuit includes a selector for selecting whether or not to latch new data in said flip-flop.

6. The semiconductor integrated circuit device according to claim 5, wherein
    said flip-flop latches and holds an input signal in response to said selector only when said operation control signal is ON, and
    said flip-flop outputs held data when said operation control signal is OFF.

7. The semiconductor integrated circuit device according to claim 1, further comprising a gated clock generation part for generating said gated clock, wherein
    said gated clock generation part includes a flip-flop and an AND circuit.

8. The semiconductor integrated circuit device according to claim 1, wherein
    each said circuit block is supplied with a single gated clock.

9. The semiconductor integrated circuit device according to claim 1, wherein
    a master clock is input in said first circuit block as a gated clock, and either a gated clock generated by employing an operation control signal generated in said first circuit block as a gate signal or said master clock is input in said second circuit block as a gated clock.

10. A method of designing a semiconductor integrated circuit device comprising a plurality of circuit blocks having a hierarchical structure including at least three hierarchies and outputting an operation control signal from each upper hierarchy to each lower hierarchy, comprising steps of:
    selecting at least one gated clock from a group including at least three gated clocks consisting of at least two gated clocks generated by employing at least two said operation control signals output to different hierarchies as gate signals and a prescribed gated clock input in a circuit block of the most significant hierarchy as a gated clock input in a circuit block of a lower hierarchy below a third hierarchy among said plurality of circuit blocks; and
    designing for inputting said selected at least one gated clock in said circuit block below said third hierarchy.

11. The method of designing a semiconductor integrated circuit device according to claim 10, wherein
    said step of selecting at least one gated clock input in said circuit block of said lower hierarchy below said third hierarchy includes a step of selecting at least one gated clock satisfying a prescribed circuit constraint from the plurality of gated clocks included in said group.

12. The method of designing a semiconductor integrated circuit device according to claim 11, wherein
    said step of selecting at least one gated clock satisfying said prescribed circuit constraint includes steps of:
        determining whether or not a first gated clock generated through said operation control signal for said lower hierarchy satisfies said prescribed circuit constraint, and
        selecting said first gated clock when said first gated clock satisfies said prescribed circuit constraint while replacing said first gated clock with a second gated clock for said upper hierarchy satisfying said prescribed circuit constraint when said first gated clock does not satisfy said prescribed circuit constraint.

13. The method of designing a semiconductor integrated circuit device according to claim 11, wherein
    said prescribed circuit constraint includes such a constraint that a single gated clock operates at least a prescribed number of flip-flops.

14. The method of designing a semiconductor integrated circuit device according to claim 12, further comprising a step of deleting unnecessary said first gated clock for said lower hierarchy when replacing said first gated clock with said second gated clock for said upper hierarchy.

15. The method of designing a semiconductor integrated circuit device according to claim 10, wherein
    a master clock is input as said gated clock in a circuit block of a first hierarchy defining the most significant hierarchy among said plurality of circuit blocks, and
    a circuit block of a second hierarchy defining a lower hierarchy for said first hierarchy receives either a gated clock generated by employing an operation control signal output from said circuit block of said first hierarchy to said second hierarchy as a gate signal or said master clock.

16. The method of designing a semiconductor integrated circuit device according to claim 10,
    operating said circuit block of said lower hierarchy only during operation of said circuit block of said upper hierarchy.

17. The method of designing a semiconductor integrated circuit device according to claim 10, wherein
    each said circuit block includes:
        a data holding circuit for holding data, and
        a selection circuit for selecting whether or not to hold newly input data in said data holding circuit on the basis of said operation control signal,
        data holding circuit holds an input signal in response to said selection circuit only when said operation control signal is ON, and said data holding circuit outputs held data when said operation control signal is OFF.

18. The method of designing a semiconductor integrated circuit device according to claim 17, wherein said data holding circuit includes a flip-flop, and said selection circuit includes a selector for selecting whether or not to latch new data in said flip-flop.

19. The method of designing a semiconductor integrated circuit device according to claim 10, further comprising a step of providing a gated clock generation part, having a flip-flop and an AND circuit, for generating said gated clock.

20. A semiconductor integrated circuit device comprising:

a first circuit block;

a second circuit block formed within a region of said first circuit block; and a third circuit block formed within a region of said second circuit block, wherein said second circuit block is controlled by an operation controlled by an operation control signal generated in said first circuit block;

said third circuit block is controlled by an operation control signal generated in said second circuit block; and employing one gated clock selected from a group consisting of at least two gated clocks generated by employing said operation control signals generated in said first and second circuit blocks as gate signals and a prescribed gated clock input in said first circuit block as a gated clock input in said third circuit block.

* * * * *